United States Patent [19]

Enokido et al.

[11] Patent Number: 4,901,907
[45] Date of Patent: Feb. 20, 1990

[54] HEAT EXCHANGER CORE MADE OF ALUMINUM AND METHOD FOR APPLICATION OF FLUX DURING PROCESS OF SOLDERING THEREOF

[75] Inventors: Hiroaki Enokido, Kanagawa; Takayuki Hatanaka, Fujisawa; Takashi Kozono, Narashino, all of Japan

[73] Assignees: Nihon Radiator Co. Ltd.; Pacific Machinery and Engineering Co. Ltd., both of Tokyo, Japan

[21] Appl. No.: 159,195

[22] Filed: Feb. 23, 1988

[30] Foreign Application Priority Data

Feb. 27, 1987 [JP] Japan .................................. 62-44421
Mar. 30, 1987 [JP] Japan .................................. 62-78749

[51] Int. Cl.$^4$ ............................................. B23K 31/02
[52] U.S. Cl. ...................................... 228/183; 228/223
[58] Field of Search ........... 228/183, 223, 224, 263.17; 427/310; 165/148, 151, 152, 153, 173

[56] References Cited

U.S. PATENT DOCUMENTS 4,723,597  2/1988  Sonoda .................................. 228/223

FOREIGN PATENT DOCUMENTS 2460174  1/1981  France .................................. 228/223
140677  6/1987  Japan .

*Primary Examiner*—Noah P. Kamen
*Attorney, Agent, or Firm*—Horst M. Kasper

[57] ABSTRACT

A method for production of a heat exchanger is disclosed, where a powder flux is applied in a process of soldering a heat exchanger core of aluminum. An annular groove is formed in a seat plate. Measures are taken for preventing wetting of the annular groove of the seat plate when sprayed with the water on the preassembled core, such that a non-corrosive flux would not adhere to the annular groove of the seat plate. Water is sprayed in the form of a mist on a preassembled heat exchanger core through plurality of spray nozzles. The annular grooves of the seat plates are thoroughly dried after the application of water for attaining a perfect absence of residual non-corrosive flux in the annular grooves of the seat plates. A non-corrosive flux powder is sprayed onto the preassembled heat exchanger core of aluminum with a powder spray gun. The non-corrosive flux is caused to adhere fast to the portion wetted with the water.

15 Claims, 2 Drawing Sheets

SPRAYING OF WATER

SPRAYING OF THE NON-CORROSIVE FLUX

SOLDERING

DRYING

SPRAYING OF THE MIXED SOLUTION

TREATMENT BY THE IMMERSION

SOLDERING

HEAT EXCHANGER
CORE OF ALUMINUM

DRYING

HEAT EXCHANGER CORE MADE OF ALUMINUM AND METHOD FOR APPLICATION OF FLUX DURING PROCESS OF SOLDERING THEREOF

BACKGROUND OF THE INVENTION

1. Field of the Invention

The invention relates to improvements relating to a heat exchanger core of aluminum, which heat exchanger core is produced by tacking tubes, fins, and seat plates, by applying non-corrosive flux to joints, and by soldering the joints in an oven as well as to a method for the application of the non-corrosive flux during the course of the solderings.

2. Brief Description of the Background of the Invention Including Prior Art

Conventionally heat exchanger cores of aluminum are light and, inexpensive and, heat exchanger cores have found extensive utility in such heat exchanger applications as radiators, condensers, and evaporators for use in automobiles instead of conventional heat exchangers made of copper alloy as taught for example, in Japanese Patent Application Disclosure SHO 59(1984)-95, 397.

SUMMARY OF THE INVENTION

1. Purposes of the Invention

It is an object of the present invention to provide an improved heat exchanger core.

The present invention has been created for the purpose of solving the problem occuring in the conventional method as described above. A first object of the present invention is to provide a heat exchanger core of aluminum which keeps of no part of the applied non-corrosive flux inside of the annular groove of the seat plate.

There is the second object of the invention to improve the airtightness imparted by the O-ring and to consequently enhance the quality of the heat exchanger core of aluminum to be produced.

A third object of this invention is to provide a method for the application of non-corrosive flux during the course of the soldering operation, which soldering operation is performed on a heat exchanger core of aluminum, where the method increases the recovery ratio of the non-corrosive flux and, at the same time prevents the applied non-corrosive flux from resting within the annular groove of the seat plate.

It is a fourth object of this invention to furnish a method for the application of non-corrosive flux during the course of a soldering operation, where the of soldering operation performed on a heat exchanger core aluminum method allows the apparatus required to be reduced in size by providing improvements in the efficiency of the consumption of the non-corrosive flux.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

2. Brief Description of Invention

In general, a heat exchanger 1 of aluminum can be formed as illustrated in FIGS. 3 and 4 by fitting a seat plate 5 to each of two opposite ends of a heat exchanger core made of aluminum. An O-ring 8 is disclosed in an annular groove formed in the seat plate 5. The skirt 10 of a tank 9 made of synthetic resin is mounted on the O-ring plate. The O-ring 8 is kept in a compressed state under desired pressure. The claw 7 formed along the outer circumferential edge of the seat plate 5 is radially squeezed and thereby the tank 9 of synthetic resin and the heat exchanger core 2 of aluminum are integrally united.

The heat exchanger core 2 of aluminum originates and is produced in a step which comprises alternately disposing tubes 3 and fins 4 both formed with or of aluminum material and having the surface of the aluminum material coated with an oven soldering material. Such plates 5 are separately disposed along opposite ends of the tubes 3. The seat plates 5 are formed with aluminum material and have the surface coated with an oven soldering material. Heat exchanger core 20 of aluminum is produced based on soldering, and the components of the heat exchanger core are joined by tacking. The heat exchanger core made according to this step is then passed through a step of applying a non-corrosive material and to a step of soldering as illustrated in FIGS. 5(a) to (d).

The tubes 3 and the fins 4 are used in one of two possible combinations. In one combination the components of both types have the surface coated with an oven soldering material and in the other second combination the components of only one of a two types have the surface coated with the oven soldering material.

In the following the steps of treatment will be described in sequence. As illustrated in FIG. 5a first a mixed solution (3 to 5% in concentration) of a non-corrosive flux of the composition of $KAlF_4$-$K_3AlF_6$ and water are applied with the aid of a spray 21 on the heat exchanger core 20 of aluminum resulted from the tacking operation. As illustrated in FIG. 5b, the joints between the seat plates 5 and the tubes 3 are immersed in a tank containing a mixed solution of 12 to 15% in concentration of the same non-corrosive flux and water as illustrated in FIG. 5b. The treatment by the immersion is necessary because the joints between the tubes 3 and the fins 4 and those joints between the tubes 3 and the seat plates 5 are different in structure so that the joints between the tubes and the fins 4 have to be joined and seated watertightly, since the joints between the seat plates 5 and the tubes 3 are not watertightly by application of the mixed solution of a lower concentration. The heat exchanger core completed this way suffers from inferior performance. In addition the heat exchanger core, which has been subjected to the treatment by the immersion, is dried as illustrated in FIG. 5c. After the drying operation the heat exchanger core is heated for about 5 minutes in an oven kept at a temperature of about 600° C. for effecting the required soldering of the joints between the tubes 3, the fins 4, and seat plates 5.

However, the heat exchanger core of aluminum requires a step of shower coating and a step of dipping for the application of mixed solution of the non-corrosive flux and water. Therefore, it is disadvantageous that the maintenance of different non-corrosive flux concentrations in the two mixed solutions is of such difficulty as to impair the productivity of the complete process. The present heat exchanger core is associated with another disadvantage in that part of the non-corrosive flux applied to the joints between the tubes 3 and the seat plates 5 is allowed to remain after the the soldering work, and this can induce clogging of the fins, degrade the radiating properties of the fins, and spoil the appearance of the product. If part of the non-corrosive flux is allowed to adhere to the annular groove 6 in the seat plate 5, then it possibly survives the soldering operation and roughens the surface of the annular groove 6. The roughened surface of the annular groove 6 impairs the the airtightness, which the O-ring 8 is expected and required to offer at the time that the tank 9 of the synthetic resin is attached to the O-ring 8. Therefore, it is necessary to remove the part of the non-corrosive flux which has been left of the soldering operation in order to avoid and prevent such problems.

Mr. Takashi Kozono, one of the inventors of the present invention, filed his own invention and application for patent under Japanese Patent Application SHO 60(1985)-279,227 (date of application Dec. 13, 1985; date of disclosure Jun 24, 1987; serial number of disclosure SHO 62(1987)-140,677; U.S. patent application Ser. No. 940,585 dated Dec. 12, 1986) prior to the filing of the present patent application with the Patent Office of Japan. The invention of Mr. Takashi Kozono concerns a method for the application of a powdery substance on a substrate through a liquid medium. This method comprises applying the liquid on the substrate and applying the powdery substance on the surface of the substrate which had previous been coated with the liquid either directly or after removal of excess liquid with a forced air current.

For example, the invention of Mr. Takashi Kozono can be used for the application of powdery flux to opposed surfaces of non-ferrous metal pieces given to be joined by soldering.

Thus, Takashi Kozono's invention is directed to a soldering of non-ferrous metal pieces. The invention of Mr. Takashi Kozono teaches absolutely nothing about a heat exchangers core of aluminum to which the present invention is directed.

If one would try to apply Mr. Takashi Kozono's invention as set fourth in his application to a heat exchanger core of aluminum, then the non-corrosive flux would be allowed to rest on the annular grooves of seat plates provided for the support of the O-rings in much the same way as would the solder of the conventional soldering method described above and the flux on the annular grooves would survive the subsequent soldering operation and would eventually do damage to the surface of the annular grooves, at the time when the outer circumferential edges of the annular grooves are squeezed together.

Thus, the non-corrosive flux remaining on a surface of the annular grooves after the soldering operation has to be removed before the squeezing work can be performed.

Since no residue of the non-corrosive flux remains in the annular groove of the seat plate, the surface of the annular groove is not roughened according to the present invention. Therefore, when the O-ring is inserted into the annular groove, the O-ring adheres tightly to the annular groove. When the skirt of the tank of synthetic resin is mounted on the O-ring and compressed, then the O-ring contacts uniformly trouighout to a desired ratio of compression to give rise to create an airtight structure with the O-ring.

The non-corrosive flux is allowed to adhere only to the portion of the preassembled core covered with the sprayed water, since the water is first sprayed on the preassembled core and then the non-corrosive flux is sprayed on the preassembled core in a powdery state. If a proper measure is taken to prevent the annular groove of the seat plate from being wetted with the water sprayed on the preassembled core, then the non-corrosive flux is not allowed to adhere to the annular groove of the seat plate. In addition since the non-corrosive flux is sprayed in a powdery state, the present invention does not entail the disadvantage based on the spraying of the mixed solution of non-corrosive flux with water, Where a drawback is that the non-corrosive flux once deposited is washed off with the running water and that distribution of the non-corrosive flux is consequently disturbed to such an extent as to impair the appearance of the product. Moreover, since the non-corrosive flux is sprayed on in a powdery state, the portion of the non-corrosive flux sprayed but not deposited quickly enough on the core can be recovered.

BRIEF DESCRIPTION OF THE DRAWING

In the accompanying drawing, in which are shown several of the various possible embodiments of the present invention:

FIG. 2(a) illustrates placing water in the form of a spray on a preassembly heat exchanger core;

FIG. 2(b) illustrates spraying non-corrosive flux in the powdery state with the powder spray gun unto a heat exchanger preassembly;

FIG. 2(c) is a diagram illustrating the drawing of the preassembled heat exchanger core;

FIG. 2(d) illustrates the soldering treatment in an oven;

FIG. 2(e) illustrates the final product of complete heat exchanger core;

FIG. 5(a) illustrates the spraying schematically illustrates the spraying of mixed solution;

FIG. 5(b) illustrates schematically the treatment by immersion of the heat exchanger core;

FIG. 5(c) illustrates schematically the drying of heat exchanger core;

FIG. 5(d) illustrates schematically the soldering of the heat exchanger core;

DESCRIPTION OF INVENTION AND PREFERRED EMBODIMENTS

Figure 1:
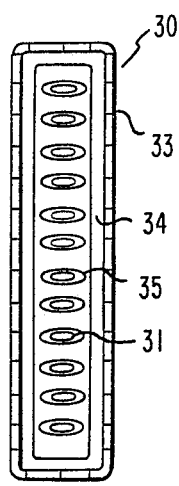
FIG. 1 is a plan view of a heat exchanger core of aluminum according to the present invention.

FIG. 1 is a plan view of the heat exchanger core of aluminum contemplated by the present invention. No non-corrosive flux is present in an annular groove 34 of seat plate 33. A soldered portion produced by an amount of non-corrosive flux is formed in the portions of fitting holes 35 between tubes 31 and seat plates 33.

The production of the heat exchanger core 30 is about as follows.

First, tubes 31 of aluminum and fins 32 of aluminum are tacked together by following a conventional method for preparing a preassembled heat exchanger core 40 of aluminum.

Figure 2A:
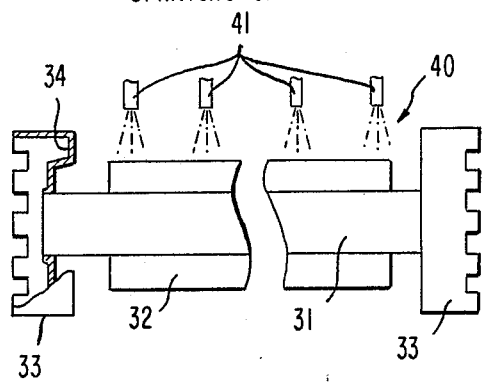
FIGS. 2(a)–2(e) are schematic diagrams explaining and illustrating a process of soldering to be performed on the heat exchanger core of aluminum according to the invention.

Then, water is sprayed in the form of a mist on the preassembled heat exchanger core through plurality of spray nozzle 41 as illustrated in FIG. 2(a). The water is sprayed uniformly throughout the entire area between the tubes 31 of aluminum. Ample application of water to the area of the joints between the tubes 31 of aluminum and the seat plates 33 of aluminum can be obtained by spraying the water with the spray nozzles 41 held diagonally, since the seat plates 33 of aluminum rise upright. The tubes 31 are forced into the seat plates 33 so tightly in the joints between the tubes 31 of aluminum and seat plates 33 of aluminum such that the gaps in the joints are sufficiently small to prevent water from reaching the annular grooves on the side of the seat plates 33 of aluminum.

Figure 2B:
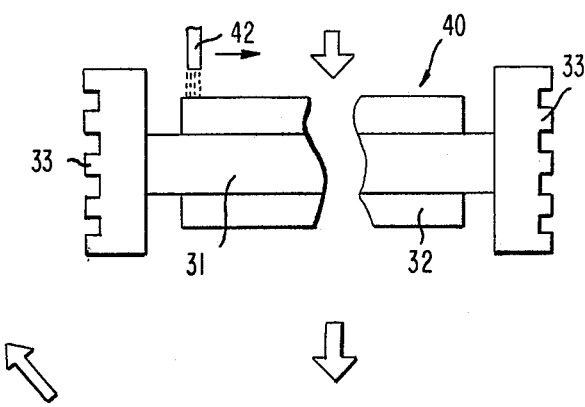

Then, the non-corrosive flux in the powdery state is sprayed onto the preassembled heat exchanger core 40 of aluminum with a powder spray gun 42 as illustrated in FIG. 2(b). The non-corrosive flux is in a powdery state and is caused to adhere fast to the portion wetted with the water sprayed in the preceding step by this spraying, and the powdery state is caused not to adhere to the portion of the preassembled heat exchanger core 40 which left unwet.

Therefore, the non-corrosive flux is uniformly sprayed from an equal distance similar to the spraying of water to the joints between the tubes 31 of aluminum and the fins 32 of aluminum. The non-corrosive flux is sprayed in diagonal direction so that the flux in the powdery state is amply applied to the aforementioned joints between the tubes 31 of aluminum and the seat plates of aluminum. A method, which moves the powder spray gun 42 relative to the surface being coated, is adopted for spraying of the non-corrosive flux in the powdery state.

This spraying of the non-corrosive flux of the powdery state is carried out in a room furnished with a suction blower. While the spraying is in progress, the suction blower is operated to recover stray non-corrosive flux powder scattered by the powder spray gun. The recovered non-corrosive powder flux is sifted for removal of foreign particles and reused.

If the application of the non-corrosive flux in the powdery state is completed, then the preassembled heat exchanger core, which core is wet because of the spraying, is dried by conventional method as illustrated in FIG. (2c).

Figure 2D:
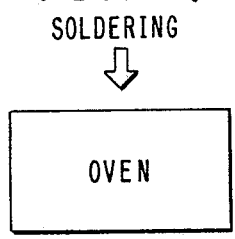
Figure 2E:
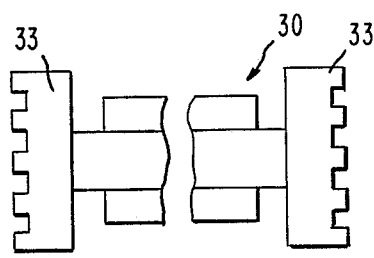
Figure 2C:
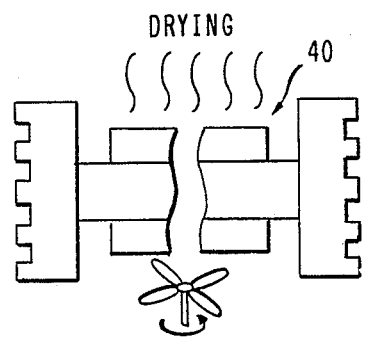
Figure 3:
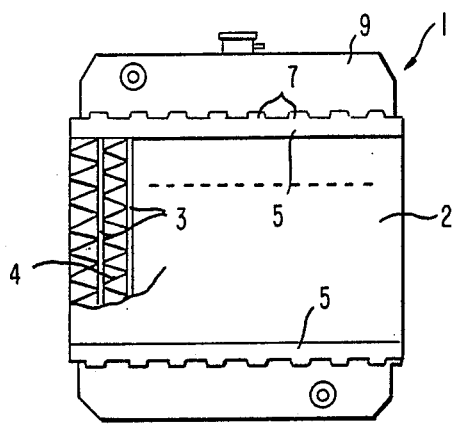
FIG. 3 is a front elevation of view of heat exchanger.
Figure 4:
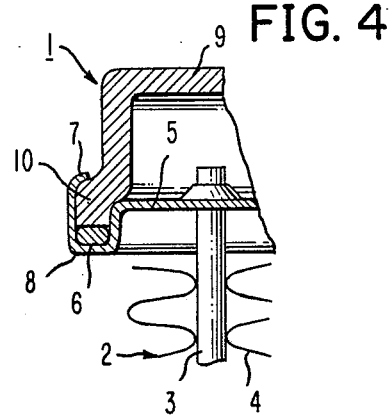
FIG. 4 is a cross section of an essential part of the heat exchanger core.
Figure 5A:
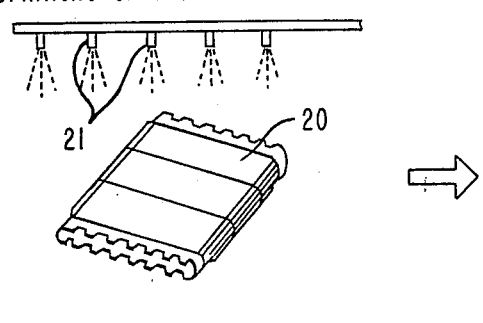
FIGS. 5(a)–5(d) are explanatory diagrams illustrating a process of soldering performed on heat exchanger core of aluminum.
Figure 5B:
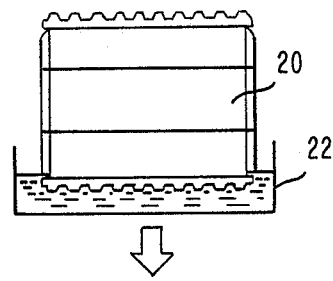
Figure 5D:
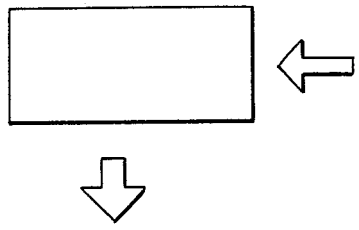
Figure 5C:
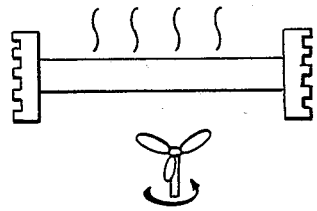

After the step of drying is completed, the preassembled heat exchanger now coated with the non-corrosive flux is subjected to a soldering treatment in an oven according to a conventional method as illustrated in FIG. 2(d). Following the soldering treatment, a complete heat exchanger core 30 of aluminum is obtained as illustrated in FIG. 2(e).

In accordance with the embodiment of this invention, there is no possibility non-corrosive flux remaining inside the annular grooves 34 after the soldering step, since the application of water and that of the non-corrosive flux are effected such as to prevent the water and the non-corrosive flux from adhering to the interior of the annular grooves 34 of the seat plates 33 of aluminum. Therefore, the interior of the annular grooves 34 does not require any cleanings. Furthermore, the tightness to air passage, which is to be established later by the union of the O-ring and the tank of synthetic resin, is safely retained.

The recovery ratio of the non-corrosive flux is conspicuously high according to the present invention method as compared with a conventional method because the non-corrosive flux in the powdery state is sprayed after water has been sprayed. Since in contrast, the conventional method uses the non-corrosive flux in a mixed solution with water. Moreover, the recovery of the excess non-corrosive flux can be effected safely and inexpensively, since the recovery of the excess of non-corrosive flux is attained simply with a room which is provided with a suction blower. The non-corrosive flux does not move from the surface onto which it is deposited, because the non-corrosive flux is used in a powdery state. The drawback can be eliminated that the non-corrosive flux once deposited on the surface is washed off by the running water and therefore the distribution of the non-corrosive flux is disturbed as a consequence based on the disadvantage of the use of the mixed solution of non-corrosive flux with water. The disadvantage that the soldering work induces uneven firing of the surface or defective union of the joints is eliminated since the distribution of the non-corrosive flux is stable.

According to the previous embodiment, a perfect absence of residual non-corrosive flux in the annular grooves 34 of the seat plates 33 may be accomplished by keeping the annular grooves 34 of the seat plates 33 shielded or covered with a masking material during the application of a water and the application of the non-corrosive flux. Alternately, the perfect absence of residual non-corrosive flux in the annular grooves 34 of the seat plates 33 may be attained by thoroughly drying the annular grooves 34 of the seat plates 33 after the application of water as illustrated in FIG. (2a)

The preceding embodiment has been described as using tubes and fins, both of which have their surfaces coated with an oven soldering material. The present invention can be performed even where the soldering material is applied only to the surface of either the tubes or the fins.

The production method for the heat exchanger core of aluminum contemplated according to the invention need not be limited to the specific embodiment described above. Other suitable steps or some other suitable method can also be adopted.

What is claimed:

1. A method for the application of flux in a process of soldering a heat exchanger core of aluminum including the steps of
   (1) alternately disposing tubes and fins, wherein tubes and fins are formed of aluminum material and wherein the tubes and fins are coated on their surfaces with an oven soldering material; and
   (2) placing simultaneously seat plates at opposite ends of said tubes, wherein the seat plates are coated on their surfaces with an oven soldering material and wherein the seat plates are formed of aluminum material thereby forming a preassembled core;
   (3) applying a non-corrosive flux on said core;
   (4) heating said core in an oven thereby soldering the joints between said tubes, fins, and seat plates; which method is characterized by
   (5) spraying water on said preassembled core such as to prevent the sprayed water from landing on annular grooves on tank sides of said seat plates;
   (6) spraying said non-corrosive flux in powdery state on said core in such a manner as to prevent the sprayed flux from landing on said annular grooves on tank sides of said seat plates; and (7) drying the wet preassembled heat exchanger core after the spraying and after completion of the application of the non-corrosive flux powder;

(8) subjecting the preassembled heat exchanger now coated with the non-corrosive flux to a soldering treatment in an oven after completion of the drying step.

2. The method according to claim 1, wherein said spraying of water is effected by means of spray nozzles.

3. The method according to claim 1, wherein said spraying of said non-corrosive flux in the powdery state is effected by means of a spray nozzle.

4. A method for the application of flux in a process of soldering a heat exchanger core of aluminum comprising the steps of (1) alternately disposing tubes made of aluminum and fins made of aluminum where either the tubes or the fins are coated on their respective surface with an oven soldering material;

(2) simultaneously placing on opposite ends of said tubes seat plates coated on their surfaces with an oven soldering material and formed of aluminum material thereby forming a preassembled core;

(3) spraying water on said preassembled core in such a manner as to prevent the sprayed water from landing on annular grooves on tank sides of said seat plates;

(4) spraying non-corrosive flux in powdery state on said core in such a manner as to prevent the sprayed flux from landing on said annular grooves on tank sides of said seat plates;

(5) then drying the wet core; and (6) heating said core in an oven thereby soldering the joints between said tubes, fins, and seat plates.

5. The method according to claim 4, wherein said spraying of water is effected by means of spray nozzles.

6. The method according to claim 4, wherein said spraying of said non-corrosive flux in the powdery state is effected by means of a spray nozzle.

7. A method for the application of flux in a process of soldering a heat exchanger core of aluminum comprising the steps of (1) forming an annular groove in a seat plate;

(2) taking measures for preventing wetting of the annular groove of the seat plate when sprayed with the water on a preassembled core including tubes with fins and seal plate, such that a non-corrosive flux would not adhere to the annular groove of the seat plate;

(3) spraying water in the form of a mist on a preassembled heat exchanger core through a plurality of spray nozzles;

(4) spraying a non-corrosive flux in a powdery state onto the preassembled heat exchanger core of aluminum with a powder spray gun;

(5) causing the non-corrosive flux to adhere fast to the portion wetted with the water sprayed in the preceding step by this non-corrosive flux spraying, and causing the non-corrosive flux substantially not to adhere to the non-wet portion of the preassembled heat exchanger core;

(6) retaining the non-corrosive flux on the surface onto which it is deposited based on the powdery state of the non-corrosive flux.

8. The method according to claim 7 wherein:

(1) the step of assemblying further comprising forcing said tubes tightly into joint areas defining fitting holes in said seat plates;

(2) the step of spraying water further comprising spraying the entire area around said tubes;

(3) the step of spraying flux further comprising applying flux to said joint areas;

(4) providing a room with a suction blower in which the flux spraying takes place so as to recover stray flux;

(5) sifting said stray flux for removed of foreign particles so that the flux may be reused;

(6) the step of heating further comprising heating the core for 5 minutes in an oven at a temperature of about 600° C.;

(7) placing an O-ring into the annular groove formed in the seat plate;

(8) mounting a skirt of a tank made of synthetic resin on the O-ring disposed in the annular groove of the seat plate;

(9) pressing the skirt of the tank of synthetic resin against the O-ring to create an airtight structure with the O-ring;

(10) keeping the O-ring in a compressed state under desired pressure;

(11) radially squeezing a claw formed along the outer circumferential edge of the seat plate and thereby integrally uniting the tank of synthetic resin and the heat exchanger core of aluminum.

9. The method according to claim 7 wherein (1) the step of assemblying further comprising forcing said tubes tightly into joint areas defining fitting holes in said seat plates such that there are no gaps in said joint areas; and (2) the step of spraying water further comprises spraying the entire area around said tubes.

10. The method according to claim 7 wherein the step of spraying flux further comprises applying flux to said joint areas.

11. The method according to claim 7 further comprising (1) providing a room with a suction blower in which the flux spraying takes place so as to recover stray flux; and (2) sifting said stray flux for removal of foreign particles so the stray flux may be reused.

12. The method according to claim 11 wherein the step of heating further comprises heating the core for 5 minutes in an oven at a temperature at about 600° C.

13. The method according to claim 7 further comprising (1) inserting the O-ring into the annular groove;

(2) mounting a skirt of a tank made of synthetic resin on the O-ring disposed in the annular groove of the seat plate;

(3) pressing the skirt of the tank of synthetic resin against the O-ring desired ratio of compression to create an airtight structure with the O-ring;

(4) keeping the O-ring in a compressed state under desired pressure;

(5) radially squeezing a claw formed along the outer circumferential edge of the seat plate and thereby integrally uniting the tank of synthetic resin and the heat exchanger core of aluminum.

14. The method according to claim 7 wherein the step of assemblying further comprises tacking tubes of aluminum and fins of aluminum together for preparing a preassembled heat exchanger core of aluminum.

15. The method according to claim 7 wherein the step of assemblying further comprises coating the surface of the seat plates, the tubes and the fins with an oven soldering material, and placing seat plates separately at respective opposite ends of the tubes.

* * * * *